United States Patent
Permenter et al.

(10) Patent No.: US 11,789,760 B2
(45) Date of Patent: *Oct. 17, 2023

(54) ALERTING, DIAGNOSING, AND TRANSMITTING COMPUTER ISSUES TO A TECHNICAL RESOURCE IN RESPONSE TO AN INDICATION OF OCCURRENCE BY AN END USER

(71) Applicants: Alexander Permenter, Macon, GA (US); Christopher Wheeler, Warner Robins, GA (US)

(72) Inventors: Alexander Permenter, Macon, GA (US); Christopher Wheeler, Warner Robins, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,142

(22) Filed: Jan. 10, 2022

(65) Prior Publication Data
US 2022/0129287 A1   Apr. 28, 2022

Related U.S. Application Data

(63) Continuation of application No. 16/665,968, filed on Oct. 28, 2019, now Pat. No. 11,231,944.
(Continued)

(51) Int. Cl.
*G06F 9/451*   (2018.01)
*G06F 11/34*   (2006.01)
(Continued)

(52) U.S. Cl.
CPC .......... *G06F 9/453* (2018.02); *G06F 11/3082* (2013.01); *G06F 11/3438* (2013.01); *H01H 13/14* (2013.01)

(58) Field of Classification Search
CPC .. G06F 9/453; G06F 11/3082; G06F 11/0775; H01H 13/14
See application file for complete search history.

(56) References Cited

U.S. PATENT DOCUMENTS 8,509,100 B2   8/2013   Roskowski
9,007,465 B1   4/2015   Fontanez et al.
(Continued)

FOREIGN PATENT DOCUMENTS

WO   2012018733   2/2012
WO   2018156393   8/2018
WO   2020092286   5/2020

OTHER PUBLICATIONS

Permenter, Alexander; Extended European Search Report for application No. 19879749.0, filed Oct. 29, 2019, dated Jul. 1, 2022, 11 pgs.
(Continued)

*Primary Examiner* — Beau D Spratt
(74) *Attorney, Agent, or Firm* — Taylor English Duma LLP

(57) ABSTRACT

Systems, methods, and software for providing collection and curation of real-time data and submission to a technical resource upon an indication of an issue in a computing device from an end user. The computing device is monitored and computer usage data and system diagnostic data collected from the device during use by an end user. Upon receiving an indication from the user of an occurrence of an issue, additional information regarding the issue is collected from the end user while additional system diagnostic data about the computing device at a time of occurrence of the issue is collected. The collected information and data are then curated by the computing device in regard to the issue and transmitted to a remote server for access by a technical resource.

20 Claims, 10 Drawing Sheets

US 11,789,760 B2
Page 2

Related U.S. Application Data

(60) Provisional application No. 62/751,911, filed on Oct. 29, 2018.

(51) Int. Cl.
*H01H 13/14* (2006.01)
*G06F 11/30* (2006.01)

(56) References Cited

U.S. PATENT DOCUMENTS

| | | | |
|---|---|---|---|
| 9,495,062 | B1 | 11/2016 | Reiner et al. |
| 10,540,223 | B1 | 1/2020 | Johansson et al. |
| 11,231,944 | B2 | 1/2022 | Permenter et al. |
| 2002/0194319 | A1 | 12/2002 | Ritche |
| 2005/0183143 | A1* | 8/2005 | Anderholm ......... G06F 11/3438 726/22 |
| 2007/0088701 | A1 | 4/2007 | Rao |
| 2007/0162932 | A1 | 7/2007 | Mickle et al. |
| 2009/0240985 | A1 | 9/2009 | Baranowsky |
| 2009/0245747 | A1 | 10/2009 | Beyabani |
| 2010/0255906 | A1* | 10/2010 | Chen ..................... A63F 13/10 463/31 |
| 2014/0129612 | A1 | 5/2014 | Hamilton et al. |
| 2015/0371237 | A1 | 12/2015 | Cooper |
| 2016/0037126 | A1 | 2/2016 | Polyakov et al. |
| 2016/0173486 | A1 | 6/2016 | Abbott |
| 2017/0091009 | A1 | 3/2017 | Bhattacharyya et al. |
| 2017/0243228 | A1* | 8/2017 | Wang ..................... G06F 11/079 |
| 2017/0339178 | A1 | 11/2017 | Mahaffey et al. |
| 2018/0146093 | A1* | 5/2018 | Kumar ................ H04M 3/5232 |
| 2018/0239694 | A1 | 8/2018 | Nallabothula et al. |
| 2019/0044825 | A1 | 2/2019 | Vijayakumar et al. |
| 2019/0208058 | A1 | 7/2019 | Dvorkin et al. |
| 2019/0361760 | A1 | 11/2019 | Krishnan et al. |
| 2020/0133698 | A1 | 4/2020 | Permenter et al. |

OTHER PUBLICATIONS

Permenter, Alexander; Advisory Action for U.S. Appl. No. 16/665,968, filed Oct. 28, 2019, dated Mar. 9, 2021, 6 pgs.

Permenter, Alexander; Applicant-Initiated Interview Summary for U.S. Appl. No. 16/665,968, filed Oct. 28, 2019, dated Feb. 26, 2021, 6 pgs.

Permenter, Alexander, Final Office Action for U.S. Appl. No. 16/665,968, filed Oct. 28, 2019, dated Dec. 3, 2020, 33 pgs.

Permenter, Alexander; Non-Final Office Action for U.S. Appl. No. 16/665,968, filed Oct. 28, 2019, dated Jun. 24, 2021, 27 pgs.

Permenter, Alexander; Non-Final Office Action for U.S. Appl. No. 16/665,968, filed Oct. 28, 2019, dated Jul. 2, 2020, 26 pgs.

Permenter, Alexander; Notice of Allowance for U.S. Appl. No. 16/665,968, filed Oct. 28, 2019, dated Nov. 26, 2021, 9 pgs.

Permenter, Alexander; International Preliminary Report on Patentability for PCT Application No. PCT/US19/58431, filed Oct. 29, 2019, dated May 14, 2021, 6 pgs.

Permenter, Alexander; International Search Report and Written Opinion for PCT Application No. PCT/US19/58431, filed Oct. 29, 2019, dated Jan. 17, 2020, 7 pgs.

* cited by examiner

Button Dashboard

Hello, Company Name! Check out your buttons in action:

| pressTime | hostName | sourceIP | username |
|---|---|---|---|
| Sun, Apr 21 7:52AM | DESKTOP_1169 | 10.1.1.18 | DRDC\smithr |
| Sat, Apr 20 4:40 PM | DESKTOP_4135 | 10.1.134.26 | DRDC\jonesj |
| Sat, Apr 20 4:37 PM | DESKTOP_4135 | 10.1.134.26 | DRDC\jonesj |
| Sat, Apr 20 4:24 PM | DESKTOP_4135 | 10.1.134.26 | DRDC\jonesj |
| Sat, Apr 20 3:53 PM | LAPTOP1954_K | 37.19.215.204 | DRDC\palmerb |
| Sat, Apr 20 3:09 PM | DESKTOP_223 | 10.1.2.128 | DRDC\kingr |
| Sat, Apr 20 2:42 PM | DESKTOP_1195 | 10.1.2.115 | DRDC\paulr |
| Sat, Apr 20 2:18 PM | DESKTOP_2387 | 10.1.134.207 | DRDC\masonw |
| Sat, Apr 20 2:03 PM | DESKTOP_4135 | 10.1.134.26 | DRDC\jonesj |
| Sat, Apr 20 1:56 PM | DESKTOP_3341 | 10.1.1.59 | DRDC\nelsonb |

FIG. 6

ALERTING, DIAGNOSING, AND TRANSMITTING COMPUTER ISSUES TO A TECHNICAL RESOURCE IN RESPONSE TO AN INDICATION OF OCCURRENCE BY AN END USER

CROSS-REFERENCE TO RELATED APPLICATIONS

This application is a continuation of U.S. patent application Ser. No. 16/665,968, filed Oct. 28, 2019, and entitled "ALERTING, DIAGNOSING, AND TRANSMITTING COMPUTER ISSUES TO A TECHNICAL RESOURCE IN RESPONSE TO A DEDICATED PHYSICAL BUTTON OR TRIGGER," which claims the benefit of U.S. Provisional Patent Application No. 62/751,911, filed Oct. 29, 2018, and entitled "ALERTING, DIAGNOSING, AND TRANSMITTING COMPUTER ISSUES TO A TECHNICAL RESOURCE IN RESPONSE TO A DEDICATED PHYSICAL BUTTON OR TRIGGER," the entireties of which are hereby incorporated herein by these references.

BACKGROUND

Most information technology ("IT") departments and third party IT support companies use some variation of an issue reporting system or "ticketing system" to track support requests from end users. These ticketing systems are designed to manage, route, direct, and track requests and are frequently made available directly to the end users of the computer systems that are supported. End users are typically able to submit a support request or "ticket" via a phone call, web-site, or application. Submitting a ticket may involve the end user describing the issue in their own words and often relies on the user's ability to articulate the issue in a way that is meaningful and useful to the technical resource working to resolve it.

These traditional ticketing systems present many challenges to timely and thorough issue resolution, including end-users misrepresenting, or inadequately describing the issue or the circumstances leading up to its occurrence; the scope or impact of the issue being unknown or exaggerated; end users that ignore or circumvent the ticketing system; lack of detailed documentation of issue and requests; inability of the technical resource to reliably reproduce the issue; too many parties between the end user and the technical resource; irrelevant information included in the issue description; inability of the technical resource to contact the end user who entered the support request for additional information; end users being unable to stop working long enough to discuss the issue with the technical resource to properly troubleshoot; response time to the issue being inordinately delayed; non-uniform data collection and reporting of issues to management; and/or the like.

It is with respect to these considerations and others that the disclosure made herein is presented.

SUMMARY

The present disclosure relates to systems, methods, and software for providing collection and curation of real-time data and submission to a technical resource upon an indication of an issue in a computing device from an end user. An exemplary method includes monitoring and collecting computer usage data and system diagnostic data from the computing device during use by the end user. Upon receiving an indication from the user of an occurrence of an issue, additional information regarding the issue is collected from the end user while additional system diagnostic data about the computing device at a time of occurrence of the issue is collected. The collected information and data are then curated by the computing device in regard to the issue and transmitted to a remote server for access by a technical resource.

In further embodiments, an exemplary system comprises a computing device and a remote server connected to the computing device over a network. The computing device is configured to monitor and collect computer usage data and system diagnostic data from the computing device during use by an end user. Upon receiving an indication from the end user that an issue has occurred, additional information regarding the issue is collected from the end user while additional system diagnostic data about the computing device at a time of occurrence of the issue is collected. The collected computer usage data, information, and system diagnostic data is then transmitted to the remote server for entry into a ticketing system associated with the technical resource.

In further embodiments, an exemplary computer-readable storage medium comprises computer-executable instructions that, when executed by processor of a computing device, cause the computing device to receive an indication of the occurrence of an issue in the computing device from an end user. Upon receiving the indication of the occurrence of the issue, information regarding the issue is collected from the user through a graphical user interface ("GUI") displayed on a display of the computing device while system diagnostic data about the computing device at a time of occurrence of the issue is collected. The collected information and system diagnostic data is curated in regard to the issue and forwarded to a technical resource for resolution of the issue.

Various embodiments and implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the scope of this application and protected by the accompanying claims.

BRIEF DESCRIPTION OF THE DRAWINGS

FIG. 6 is a screen diagram showing a GUI for an exemplary active/historical button display provided by a back-end server system, according to embodiments described herein.

DEFINITION OF TERMS

Figure 1:
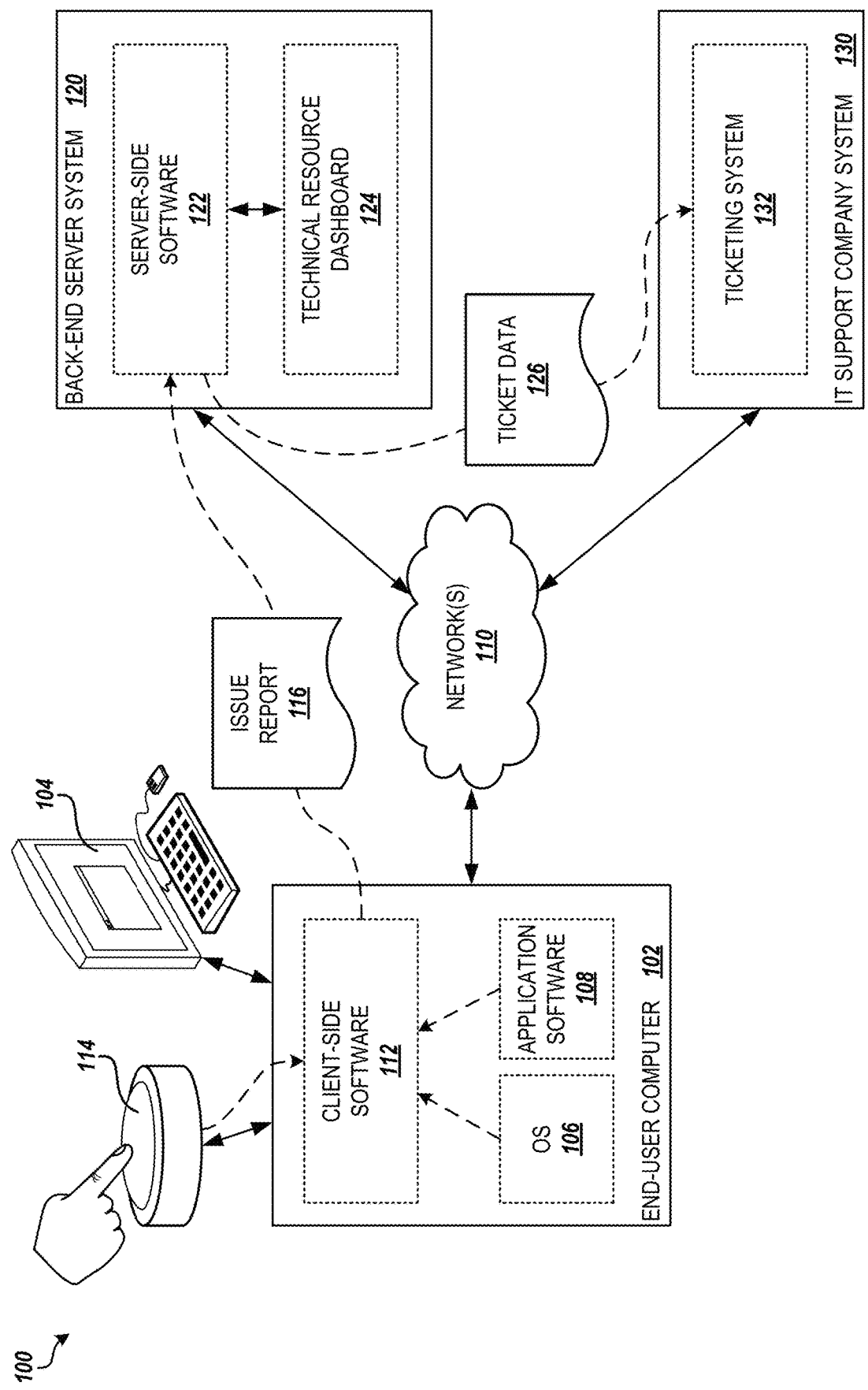
FIG. 1 is a block diagram of an environment 100 in which a dedicated physical user input device used to trigger collection and curation of real-time data and submission to a technical resource may be implemented, according to embodiments described herein.

Technical Resource—A human technician, engineer or artificial intelligence in a computing-related field that is employed in the diagnostic, troubleshooting and remediation process for resolving computing/networking or electronic security issues. The technical resource may be employed by or associated with an IT support company.

System—A computer, a group of computers, or a group of computing resources in a home, office, or enterprise environment and/or the network that connects these computers to each other and to the Internet.

End User—A human that is generally non-technical in the computing field or that does not resolve technical issues as one of their job functions. End users use the software and systems that the technical resources work to maintain.

IT Support Company—The in-house IT department, hired managed service provider, contracted tech. support company, or individual who provides the technical resources to the end users.

Ticketing System—A software program that is used to collect and organize support requests and projects, including various "ticketing" platforms, PSAs, and CRMs.

Issue—Any software or hardware failure or perceived failure or fault; any information technology-related training or end-user request; or any concern about a computer or system that is causing it to not perform as expected by the end user.

DETAILED DESCRIPTION

The following detailed description is directed to apparatuses, systems, and methods for providing collection and curation of real-time data and submission to a technical resource upon an indication of an issue in a computing device from an end user. Some methods and technologies described herein may be implemented as software in a computer system accessible by end users and technical resources over a network, such as the Internet.

According to some embodiments, an independent physical user input device, such as a button or switch, allows a user to automatically launch data collection and/or curation software and to send early warning signals to a technical resource. The software can interact with a ticketing system to provide automatic collection of real time diagnostic data and documentation of an issue as well as identifying information about the end-user and the end user's computer system that is experiencing the issue. The use of a dedicated physical device that is clearly labeled requires little to no user training.

Further, the software may automatically collect much of the data necessary to identify, verify and respond to the issue. Additionally, upon the end user's pressing of the button, the technical resource can get an early notification that a request is coming in. Multiple requests from the same location within a short time window can indicate a widespread issue or security concern and allow the technical resource to begin investigating even before the requests have been fully submitted. In addition, multiple clicks from a specific computer may indicate the user's current frustration level. This is the fastest method that exists for an end user to notify a technical resource of the existence of an issue.

The physical device portion of the invention may comprise a button or trigger that connects directly to the computer physically with a cable or through a wireless connection. For example, the physical user input device may comprise a pushbutton designed to sit on the end user's desk in proximity to the end user's computer system and connected to the end user's computer by a USB cable. According to some embodiments, the physical device may have two functions: the primary single-click function that launches the data collection and ticket submission software, and a secondary function of holding down the button for an extended period that will facilitate the installation of the software.

The software portion of the invention may include programs that will run many real-time diagnostic tools upon the button being pressed. These may include, but are not limited to, the following if applicable to the system: taking a screenshot of the system, collecting the last several activities that were performed by the end user of the system before the button was pressed, collecting the current running processes on the system and their resource consumption, collecting various network diagnostics, collecting information relating to the last time the system "crashed," collecting system uptime, and the like.

The software may then prompt the end user to enter their identifying information as well as their own summary of the issue. It then packages all this information together in a standard and useful format and submits it directly to the technical resource via their tracking/ticketing software or via email or other electronic means.

FIG. 1 shows an illustrative environment 100 in which a dedicated physical user input device that is used to trigger collection and curation of real-time data and submission to a technical resource may be implemented, according to some embodiments. The environment 100 includes an end-user computer 102. The end-user computer 102 may represent a typical desktop PC, laptop, tablet, workstation, or other computer system utilized by an end user to access information and data over the Internet and/or within an enterprise environment. The end-user computer 102 typically includes standard user interface components 104, such as a display, mouse, keyboard, and the like. The end-user computer 102 may execute an operating system ("OS") 106 that controls the integration and operation of the computer's components and application software 108 utilized by the end user to perform various tasks and functions. The end-user computer 102 is further connected to various remote computer systems in the environment 100 by one or more networks 110. In some embodiments, the network(s) 110 may represent local area networks ("LANs"), wide area network ("WANs"), and/or other data, broadband, or telecommunication networks that collectively make up the Internet.

According to some embodiments, the end-user computer 102 further executes client-side software 112 that monitors various aspects of the computer system and collects and packages the data for diagnosis by the technical resource when a problem or issue with the computer is indicated. The client-side software 112 may include one or more software modules, executable files, system services, daemons, and other software components known in the art. Some components of the client-side software 112 may run in the background on the end-user computer 102 and continuously monitor computer usage and system diagnostic data, storing the usage and diagnostic data in a memory of the computer, such as RAM and/or a disk drive. Other components of the client-side software 112 may be executed automatically by the computer when an issue with the end-user computer 102 or the environment 100 in general is detected or indicated.

Figure 2:
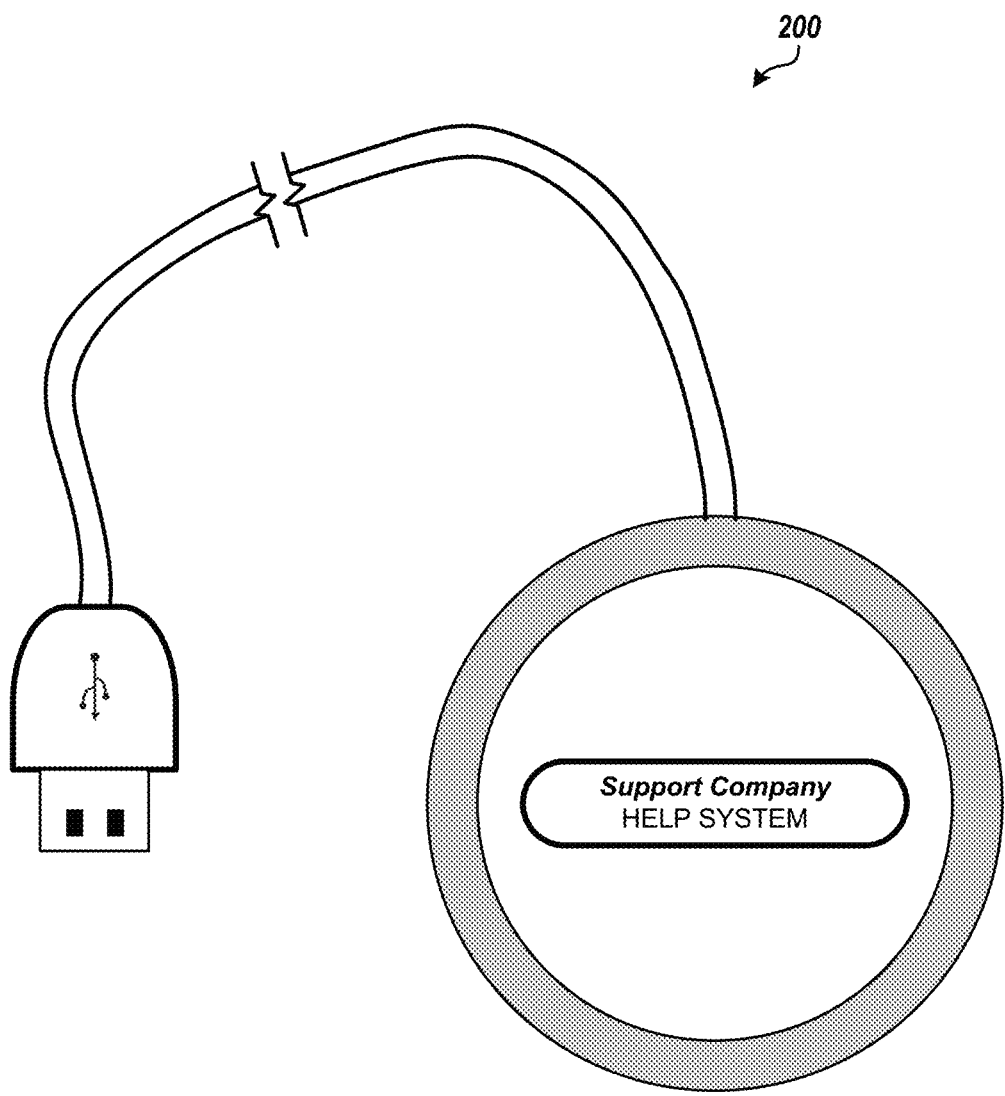
FIG. 2 is a plan view of an exemplary dedicated physical user input device comprising a USB-connected button utilized to trigger collection and curation of real-time data and submission to a technical resource, according to embodiments described herein.

According to embodiments, the occurrence of an issue may be indicated by the end user by pressing or clicking a dedicated physical user input device, such as switch or button 114 connected to the end-user computer 102. In some embodiments, the button 114 may comprise a plastic housing containing a single, round button branded with the technical resource or IT support company logo, such as that shown at 200 in FIG. 2. The button 114 may attach to the end-user computer 102 by a USB cable. In further embodiments, the button 114 may be made in any shape and of any material, and may connect to the end-user computer 102 utilizing any known connection method known in the art, including a wired connection, a proprietary wireless connection, Bluetooth, Wi-Fi, or any other current or future connection technology.

In yet further embodiments, the button 114 may represent a particular key on the keyboard of the end-user computer 102 that has been repurposed for the triggering of the collection and curation of real-time data and submission to a technical resource. For example, the "Pause/Break" key or some other seldom used key of a standard keyboard may be utilized for the trigger key and may be relabeled with a stick-on label branded with the technical resource logo. The client-side software 112 may include a component that executes in the background and "listens" for a press of the button 114.

Figure 3:
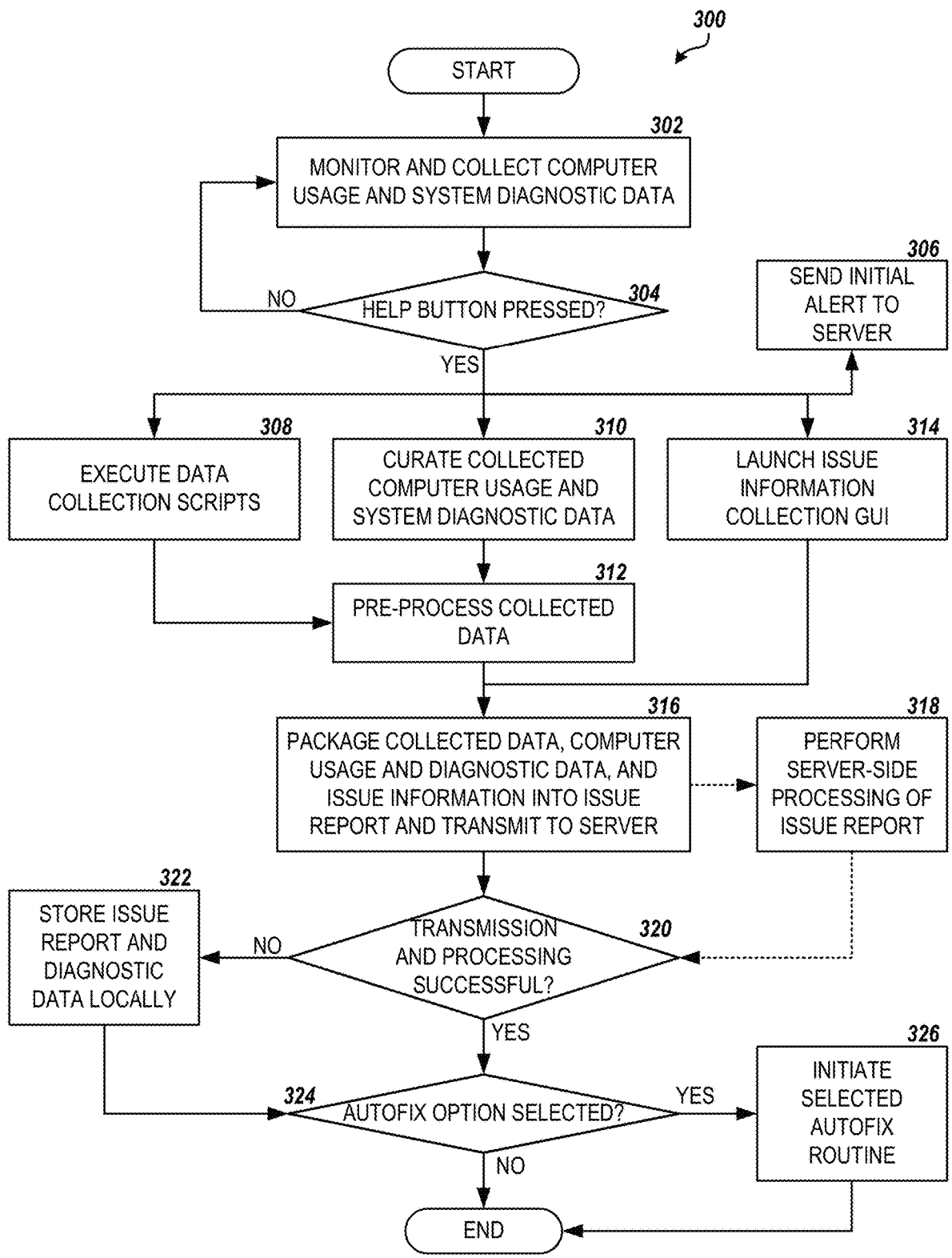
FIG. 3 is a flow diagram showing one routine for utilizing a dedicated physical user input device to trigger collection and curation of real-time data and submission to a technical resource, according to embodiments described herein.
Figure 4A:
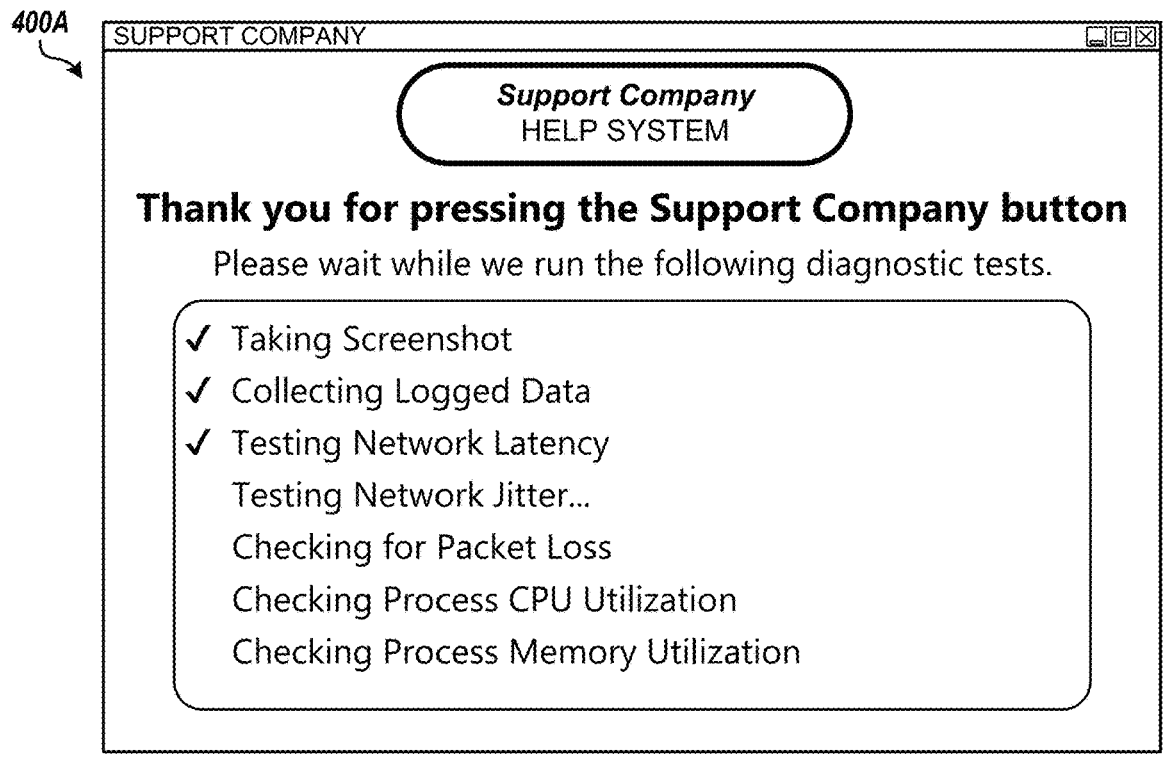
FIGS. 4A-4D are screen diagrams showing a GUI for a client-side software to collect issue information from an end user, according to embodiments described herein.
Figure 4B:
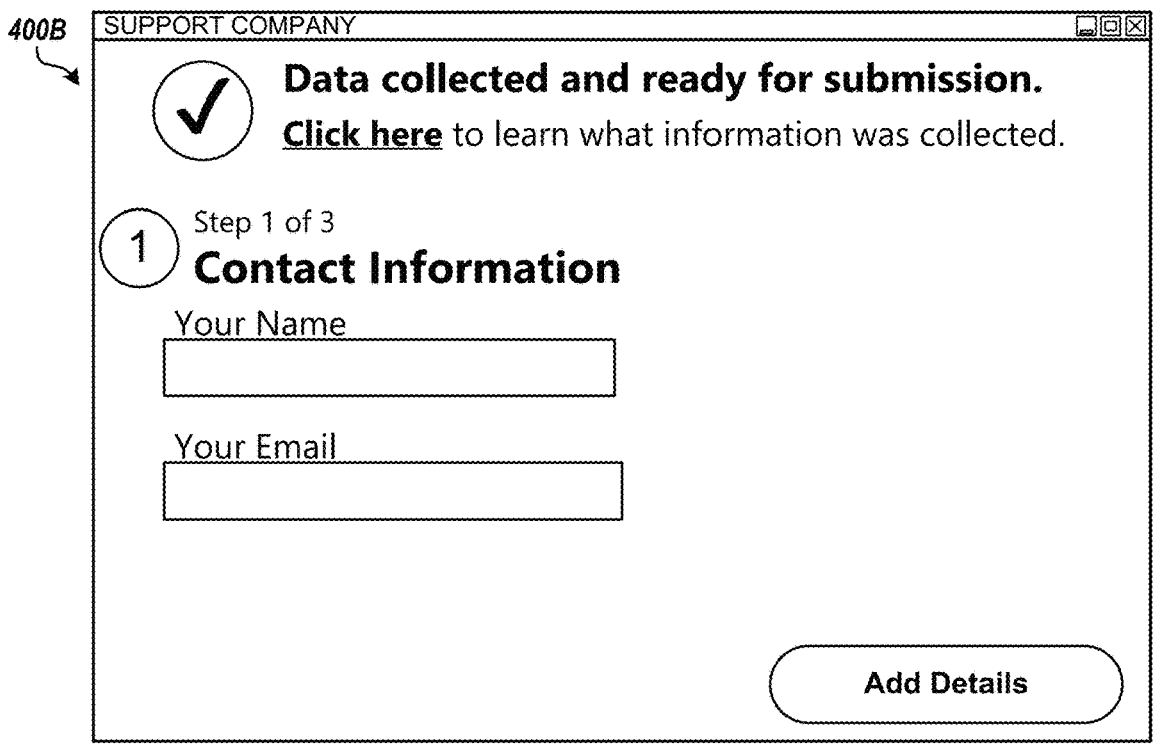
Figure 4C:
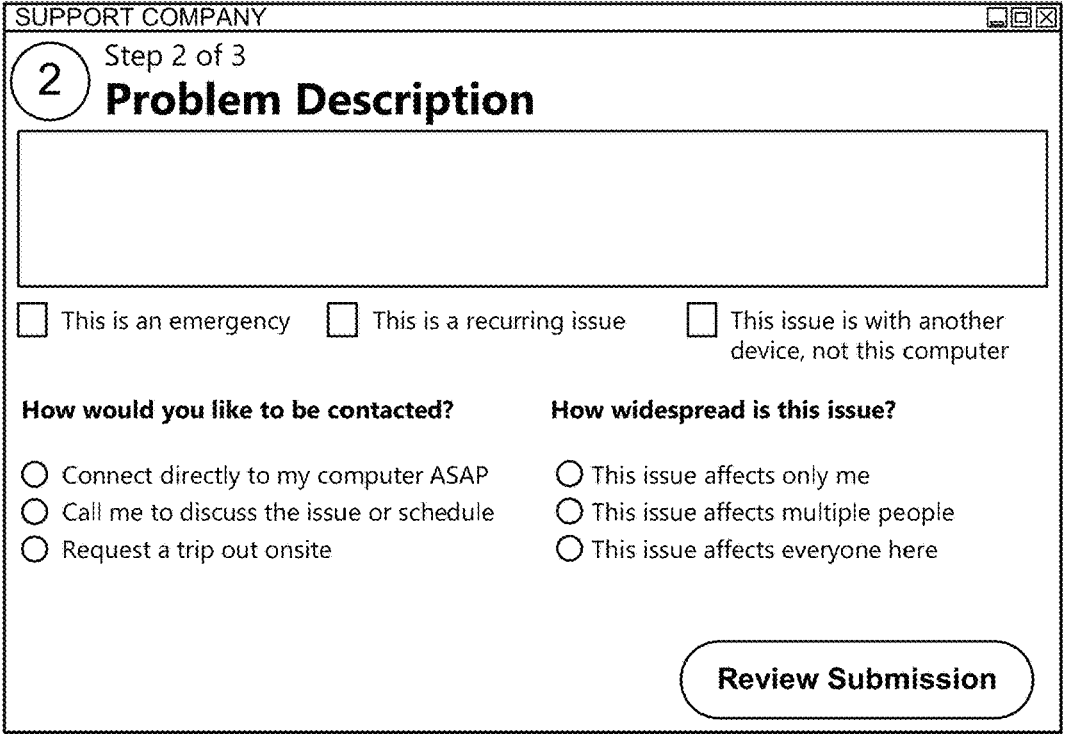
Figure 4D:
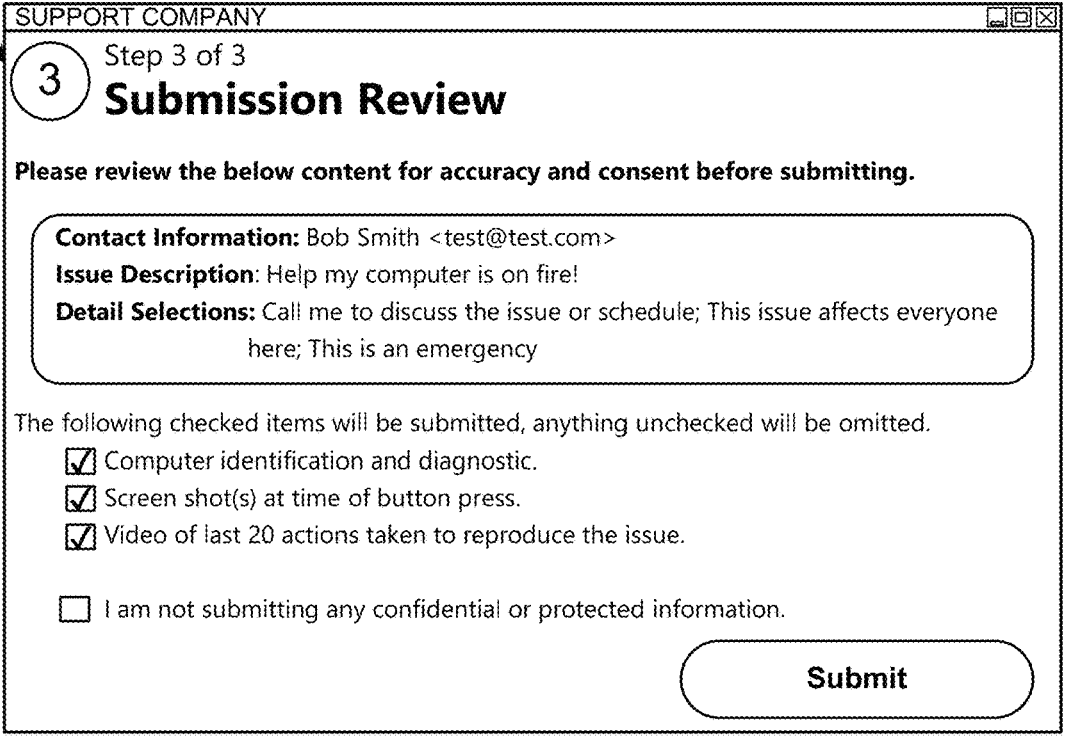

When an issue with the end-user computer 102 or the environment 100 in general is detected or indicated, such as by a press of the button 114, the client-side software 112 may initiate a routine, such as the routine 300 described herein in regard to FIG. 3, to collect additional issue information from the end-user computer 102 and/or the end user. The issue information is then packaged up with the collected computer usage and diagnostic data into an issue report 116, and transmitted over the network(s) 110 to server-side software 122 executing on a back-end server system 120. According to embodiments, the server-side software 122 receives the issue report 116 and redistributes the data to the technical resource. For example, the server-side software 122 may utilize the issue report to create a ticket in a ticketing system 132 of an IT support company system 130. In some embodiments, the server-side software 122 may send ticket data 126 pulled from the issue report 116 over the network(s) 110 to web service or endpoint provided by the ticketing system 132. In other embodiments, the server-side software 122 may format an email from the issue report 116 and send the email to a specific address associated with and/or monitored by the ticketing system 132. It will be appreciated that the server-side software 122 may be capable of supporting any number of methods and APIs for transmitting ticket data 126 to a variety and number of different ticketing systems 132, depending on the needs of the implementation.

According to some embodiments, when the server-side software 122 may provide additional issue reporting and analysis services for technical resources outside of the ticketing system 132. For example, the server-side software 122 may provide a technical resource dashboard 124 that may allow technical resources to see the details included in the various issue reports 116 or view a "heatmap" of all real-time issue reporting over a specified time interval, as will be described in more detail below in regard to FIGS. 5A-6. In further embodiments, the technical resource dashboard 124 may provide for the configuration of triggers, such as webhooks or audible alarms, to alert technical resources of certain conditions. For example, a condition such as a certain number of presses of buttons 114 connected to end-user computers 102 in a particular geographic region within a limited time period may generate a specific type of alarm that, when combined with a map or the heatmap may allow technical resources to gain immediate knowledge of the severity and scope of a wide-spread problem before the data from the individual issue reports is viewed or analyzed.

According to further embodiments, the technical resource dashboard 124 may further support an API that will allow a technical resource to create their own back-end responses to widely reported issues. Examples include an automatically triggered diagnostic routine, server failover for server problems, and/or "web-banner", automated phone message, mass email for tracking the investigation of widespread issues affecting multiple users, and the like.

The server-side software 122 may support a variety of other tasks and functions involving the curation of problem reports and other data submitted by the client-side software 112 running on any number of end-user computers 102, according to further embodiments. For example, the server-side software 122 may allow IT support companies to create accounts that are managed by the company and allow customization and bulk distribution of the client-side software 112 to end-user computers 102. This allows each IT support company to control the configuration of the client-side software 112 as well as how it interacts with end users, allowing the software to be tailored to the different standards or needs of different industries. The server-side software 122 may further allow IT support companies to customize the physical logos on their buttons 114 distributed to end-user computers 102 as well as software logos displayed by the client-side software, customize data to be collected and submitted in an issue report 116, format actions that are triggered by "auto-fix" requests, configure the method by which the server-side software 122 submits ticket data 126 to the ticketing system 132, and the like.

According to embodiments, the back-end server system 120 and the IT support company system 130 may each represent one or more server computers or virtual machines operably connected together and to the end-user computer(s) 102 over the network(s) 110 and/or cloud-based processing, database, and storage resources available to the end-user computer(s) 102 over the network(s). In some embodiments, the back-end server system 120 and the IT support company system 130 may represent separate, remote computing systems and resources, with the back-end server system 120 operated by a third-party service provider providing services to the IT support company. In other embodiments, the back-end server system 120 and the IT support company system 130 may represent the same computing systems and/or resources.

FIG. 3 illustrates one routine 300 for utilizing a dedicated physical user input device to trigger collection and curation of real-time data and submission to a technical resource, according to some embodiments. According to embodiments, the routine 300 may be performed at least in part by the client-side software 112 executing on an end-user computer 102 in conjunction with the server-side software 122 executing on a back-end server system 120 connected to the end-user computer across the network(s) 110. In further embodiments, the routine 300 may be performed by a processor of the end-user computer 102, processing resources of the back-end server system 120 and/or IT support company system 130, or by some other combination of components, processing resources, or systems.

The routine 300 begins at step 302, where the client-side software 112 continuously monitors and collects computer usage and system diagnostic data from the end-user computer 102. According to some embodiments, when the client-side software 112 is initially installed on the end-user computer 102, it may make changes to the configuration of the OS 106 to enable continuous monitoring, collection, and logging of real-time usage and diagnostic data in the background. This may include turning on several data collection tools that may already exist in the OS and editing, monitoring, and curating their configuration and output. For example, the client-side software 112 may ensure that system faults and "blue-screens" data collection is enabled, and that SMART disk drive error reporting is turned on.

In some embodiments, this may also include registering a keyboard and mouse "hook" in the OS 108 for a user input monitoring module included with the client-side software 112 that continuously watches user input. Each time the end user presses a key on the keyboard or clicks or moves the mouse, an event may be sent by the OS 108 to the monitoring module. The monitoring module then examines the event to determine whether the event is significant. The determination on whether an input event is significant may be based on several factors, including but not limited to whether the event came from the mouse or a keyboard input that does not create printable characters (e.g., F5, left arrow, page up, ctrl-alt-del, Enter, etc.); whether there has already been a significant event in the past, e.g., 150 ms; whether there has been an identical event in the past, e.g., 500 ms; and/or the like.

If the event is deemed significant, then a screenshot of all of the monitors may be taken and the current position of the cursor identified, and then the event details, screenshot(s), and cursor position, may be stored in the memory of the end-user computer 102. In some embodiments, the screenshots may be compressed in memory in order to reduce the amount of memory required to store the significant events. For example, the screenshots may be compressed using Brotli compression at level 0 (fastest) before being stored to RAM or after being stored to RAM in the background. This may cut down the RAM utilization of the stored screenshots by a factor of 10 or more. In other embodiments, the screenshots may be stored in raw format, and compressed and/or encoded at a time just before upload to the server-side software 122. This may improve performance of the end-user computer 102 in normal operation, reducing any lag in the user interface caused by the background data monitoring and collection processes.

In further embodiments, the screenshots and other details of significant events may be stored in an event "deque" (double-ended queue) where the oldest events are rotated out as new ones are added to keep the amount of memory for storing significant event details fixed. For example the event deque may be configurable in size with a default of enough memory to store 20 significant events. In yet further embodiments, the screenshots and event data may be encrypted before being stored in the memory to enhance security of the data.

In other embodiments, the client-side software 112 may utilize a diagnostic data collection tool included in the OS 108 for collection of screenshots and end user mouse clicks and keyboard strokes, such as the Problem Steps Recorder ("PSR") tool provided with the Microsoft Windows operating system. The client-side software 112 may further include utilities that run as system services and collect system and hardware metrics, including but not limited to temperatures; fan speeds; disk, memory, and CPU metrics; and/or the like. This data may be stored in a system metric deque in the memory with a configurable size, such as to contain a particular length of time of measurement, e.g., five minutes, or particular number of metric values.

From step 302, the routine 300 proceeds to step 304, where the client-side software 112 determines whether the button 114, referred to as the "help button," connected to the end-user computer 102 has been pressed. In some embodiments, the button 114 may be recognized by the OS 106 or other firmware of the end-user computer 102 as an additional keyboard, and may generate particular key combinations when pressed. For example, a momentary press or "click" of the button 114 may generate a proprietary "trigger" key combination that is not typically used by the OS 106 or other application software 108 executing on the end-user computer 102, such as CTRL-ALT-SHIFT-H. A component of the client-side software 112 may continuously listen for this "trigger" key combination indicating the end user has pressed the button 114.

In further embodiments, the button 114 may be capable of generating different key combinations depending on the type and/or duration of the button press. For example, pressing and holding down the button 114 for some duration, such as 5 seconds, may generate a key combination that causes the client-side software 112 to be updated. In some embodiments, the press and hold of the button 114 may generate a [windows key]+"R" key combination, which opens up the "Run" dialog box in the Microsoft Windows operating system, and then enter the keystrokes for an URL to download the latest customized installer for the client-side software 112. Other presses of the button 114 may trigger further functions, such as a double-click that triggers an "autofix" action or a click-and-then-hold that triggers a high-priority alert. In other embodiments the button 114 may be monitored by a driver module of the OS 106 and different components or modules of the client-side software 112 may be executed directly in response to different types and duration of button presses.

If, at step 304, the button 114 has not been pressed, then the routine 300 returns to step 302 where the client-side software 112 continues to monitor and collect monitor computer usage and system diagnostic data on the end-user computer 102. If the button 114 has been pressed, then the client-side software 112 may initiate one or more parallel data collection and curation steps, according to various embodiments. In some embodiments, the steps executed on the button press by the client-side software 112 may be based upon configuration of the software performed by technical resource on the back-end server system 120 utilizing the technical resource dashboard 124 or other application and supplied to the end-user computer 102 over the network 110 by the server-side software 122.

According to some embodiments, the client-side software 112 may initially send an alert message to the server-side software 122, as shown at step 306. The alert message may contain basic information about the end-user computer 102, such as mac address, hostname, logged in username, local IP address, and the like, that the server-side software 122 can check/verify against its own database. The server-side software 122 may retrieve additional known information about the end-user computer 102 from the database, such as physical address, past issue submission data, and the like.

The server-side software 122 may then create an entry in its database for the indicated issue with a pre-set "time-to-live" ("title"), such as one hour.

In some embodiments, these entries may be utilized to show initial data about the pending issues/events, e.g., a button has been pressed and where it is located, in the technical resource dashboard 124 while additional issue information is being collected and corresponding tickets are created in the ticketing system 132. For example, as shown in FIG. 6, the technical resource dashboard 124 may provide an active/historical button display 600 that provides a list of the most recent button presses or other indications of issues/events along with related information. The active/historical button display 600 may be rendered by the back-end server system 104 as a web page accessible through a browser over the network(s) 110 by the technical resource, for example. In additional embodiments, the active/historical button display 600 may contain a map display 602 that shows locations of recent button presses. The map display 602 may be shown as a "heatmap" of all issue/events by geographic location over some time interval, allowing technical resources to gain immediate knowledge of the severity and scope of a widespread problem before the data from the individual issue reports 116 is processed or analyzed.

In some embodiments, upon receiving the initial alert information, the server-side software 122 may further send a preemptive message to a technical resource based on based on the user of the end-user computer 102, past issue submission data for the computer, of multiple alerts received from the same location, and/or the like. The server-side software 122 may return an issue ID or other identifier to the client-side software 112 to be used with further submission of data regarding the specific issue/event. The server-side software 122 may further include updated configuration information that is utilized by the client-side software 112 to drive other of the data collection and curation steps to be executed. The configuration may be supplied in the JSON format, for example.

In further embodiments, the client-side software 112 may also execute one or more data collection and curation scripts and subroutines concurrently, as shown at step 308. The number and types of scripts to be executed may be part of the configuration received from the server-side software 122, and may include some, all, or none of the following actions:

- Take a current screenshot of all monitors of the end-user computer 102.
- Collect information on all running processes on the end-user computer 102 and the resource utilization for each.
- Collect information on the hardware state of the end-user computer 102, such as memory usage and disk performance at the time of the trigger.
- Collect the last "Blue-Screen" data that the end-user computer 102 has experienced.
- Execute a variety of network diagnostics to test system connectivity, latency, jitter, network conflicts, and the like.
- Check system uptime.
- Collect the latest Event Viewer data on the end-user computer 102.

According to further embodiments, the client-side software 112 may further curate the collected computer usage and diagnostic data collected at step 302, as shown at step 310. For example, the client-side software 112 may iterate over the screenshots in the event deque stored in the memory and add a text caption to each screenshot with a human-readable description of the associated event from the event data. From this information, the client side-software may build a 20-frame annotated slideshow as a sprite with all of the screenshots/captions and other event data. The sprite may be saved as a JPEG file with metadata about the position of each frame embedded therein. The sprite may be included in the issue report 116 transmitted to the server-side software 122.

Alternatively, the client-side software 112 may include the raw screenshots and other event data from the event deque in the issue report 116, and the server-side software 122 may build the sprite for display in the technical resource dashboard 124, according to other embodiments. Additionally, the system metrics deque may also be read with the collected system metrics included in the issue report. According to some embodiments, the JPEG containing the sprite, the event information from the event deque, and/or the system metrics from the system metrics deque may be further compressed and/or encrypted before transmission to the server-side software 122 over the network(s) 110.

According to some embodiments, after collecting the computer usage and diagnostic data at steps 308 and 310, the routine 300 may proceed to step 312, where the client-side software 112 performs additional curation or pre-processing of the collected data before transmission to the server, according to some embodiments. For example, the client-side software 112 may run any "blue-screen" data through a "blue screen" analysis tool, such as "BlueScreenView," that will supplement the raw data with potentially useful analysis. The client-side software 112 may also automatically flag collected data that is unusual or problematic in nature, such as an abnormally high disk queue time or a process that was using an abnormally high amount of memory.

The client-side software 112 may further compare any collected system metric values to conventional or historic system metrics, such as comparing the CPU temperature data to a lookup table of recommended operating temperatures for the CPU, in order to flag additional potential problems. The client-side software 112 may also compare the list of running processes to one or more known "bad process" lists sourced from various Internet repositories in order to flag potential malware. According to other embodiments, some or all of these pre-preprocessing tasks may alternatively be performed by the server-side software 122 from the raw data submitted by the client-side software 112 in the issue report 116.

In further embodiments, the client-side software 112 may display an issue information collection GUI to collect additional information from the user of the end-user computer 102 about the issue/problem they are experiencing, as shown at step 314. The issue information collection GUI may be configurable by the technical resource or IT support company and contain company-specific branding and configurable information fields for entry. For example, the client-side software 112 may show the forms 400A-400D shown in FIGS. 4A-4D to guide the end user through the issue information collection process. According to embodiments, the initial form 400A may comprise of company-specific branding and display the progress of the data collection and curation scripts and subroutines executing on the end-user computer 102 concurrently with the display of the GUI, as discussed above in regard to step 308. The initial form 400A may be displayed until the data collection and curation scripts have completed, until a response to the initial alert is received from the server-side software, for a specific duration, or until the end user interacts with the dialog.

Next, a form 400B may be displayed by the client-side software 112 that collects end user identification information. The end user identification information requested by the form 400B may be customizable depending on the technical resource or IT support company configuration choices, e.g., based on the method of identifying users in the corresponding ticketing system 132. For example, the form 400B may request the end user's name and email address. If the end user has submitted a prior issue on the end-user computer 102 in the past, the client-side software 112 may prepopulate the information fields with the last entries. The client-side software 112 may then verify the end user's identification information with the server-side software 122 before proceeding. In some embodiments, if the end user does not provide a valid identifier within the corresponding ticketing system 132, the GUI may provide the end user the ability to "register" with the IT support company and/or ticketing system before proceeding.

The client-side software 112 may then display a form 400C that requests additional information regarding the issue or problem that the end-user is experiencing. The customizable form 400C may have a text entry field for a narrative describing the problem and provide additional check boxes and or radio buttons for the end user to provide additional input, such as what method they would like the technical resource to use to contact them, the scope of the issue they are experiencing, whether the issue is recurring, whether the issue is an emergency, and/or whether the issue is with a device other than one that is part of the system being used to report the issue.

Next, a form 400D may be display by the client-side software 112 that provides a summary of the information provided by the end user through the GUI and an overview of the information collected by the data collection and curation scripts and subroutines and allows the end user to submit the information to the server-side software 122 for processing. The form 400D may contain customizable check boxes or controls obtaining end user consent for the various types of computer usage and diagnostic data collected to be submitted, and a verification that the submitted information contains no confidential or protected information, such as personally identifying information ("PII") restricted by applicable laws or regulations.

From steps 312 and/or 314, the routine 300 proceeds to step 316, where the client-side software 112 packages up the collected and pre-processed computer usage and diagnostic data from steps 308, 310, and 312 along with the issue information collected from the end user through the GUI at step 314 into an issue report 116 and uploads the issue report to the server-side software 122 on the back-end server system 120. According to various embodiments, all of the information/data in the issue report 116 may be transmitted in a single transmission to the server-side software 122, or the information/data may be transmitted over some number transmissions from the client-side software 112 to the server-side software as it becomes available.

Upon receiving the issue report 116, the server-side software 122 may perform additional processing of the issue report, as shown at step 318. For example, the server-side software 122 may perform some or all of the pre-processing of the collected data described above in regard to step 312. According to further embodiments, the server-side software 122 may perform further analysis of the data/information in the issue report 116 and highlight potential problems/issues to be looked at first by the technical resources based on the analysis.

Once the information/data in the issue report 116 has been processed, it may be forwarded to the appropriate technical resource in a manner selected by the technical resource and/or the IT support company. For example, the server-side software may package the information/data received into ticket data 126 to be entered as a ticket in the ticketing system 132 on the IT support company system 130. The format of the ticket data 126 may depend upon the API provided by the ticketing system 132 for entry of tickets. In some embodiments, entry of the ticket data 126 into the ticketing system 132 may be performed directly through an API such as a web service. In other embodiments, entry of the ticket data 126 into the ticketing system 132 may be performed indirectly, such as formatting the data in an email message and sending the message to a particular email address associated with and/or monitored by the ticketing system. Other methods of entry of the ticket data 126 into the ticketing system 132 may be imagined by one of ordinary skill in the art, and it is intended that all such methods of entry of the ticket data into the ticketing system be included in the scope of this application.

Figure 5A:
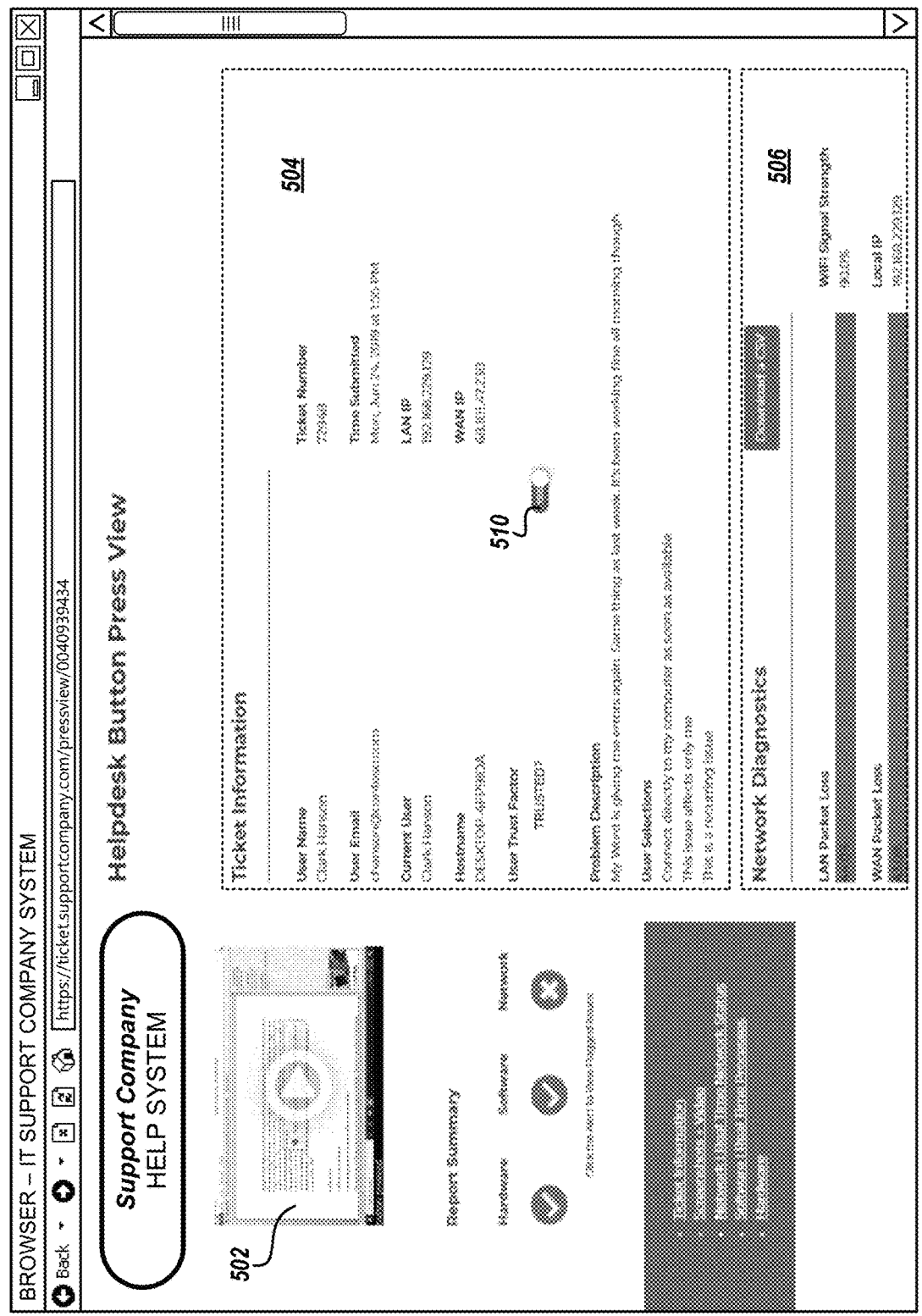
FIGS. 5A-5C are screen diagrams showing a GUI for an exemplary issue information display rendered to a technical resource in a browser, according to embodiments described herein.
Figure 5B:
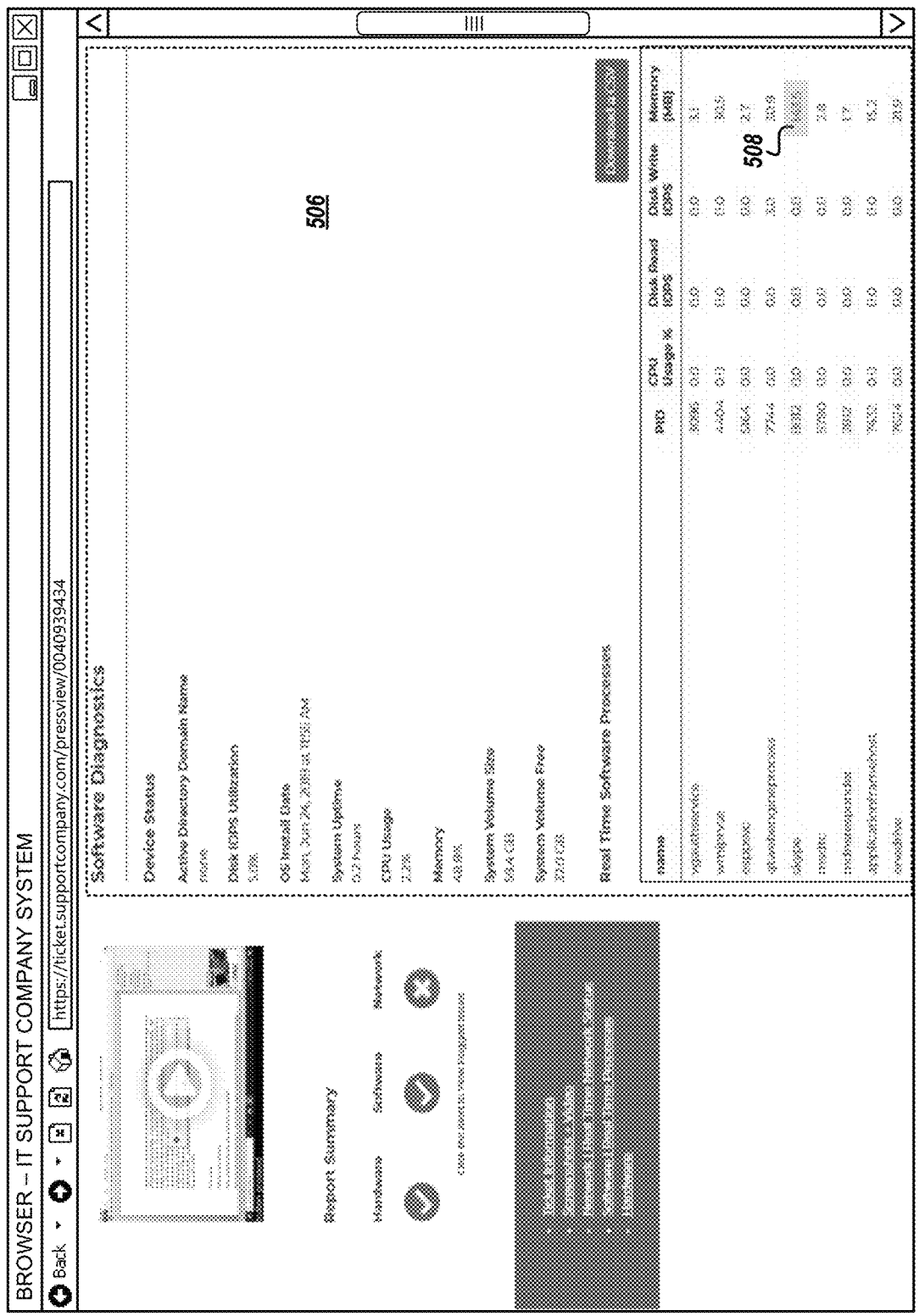
Figure 5C:
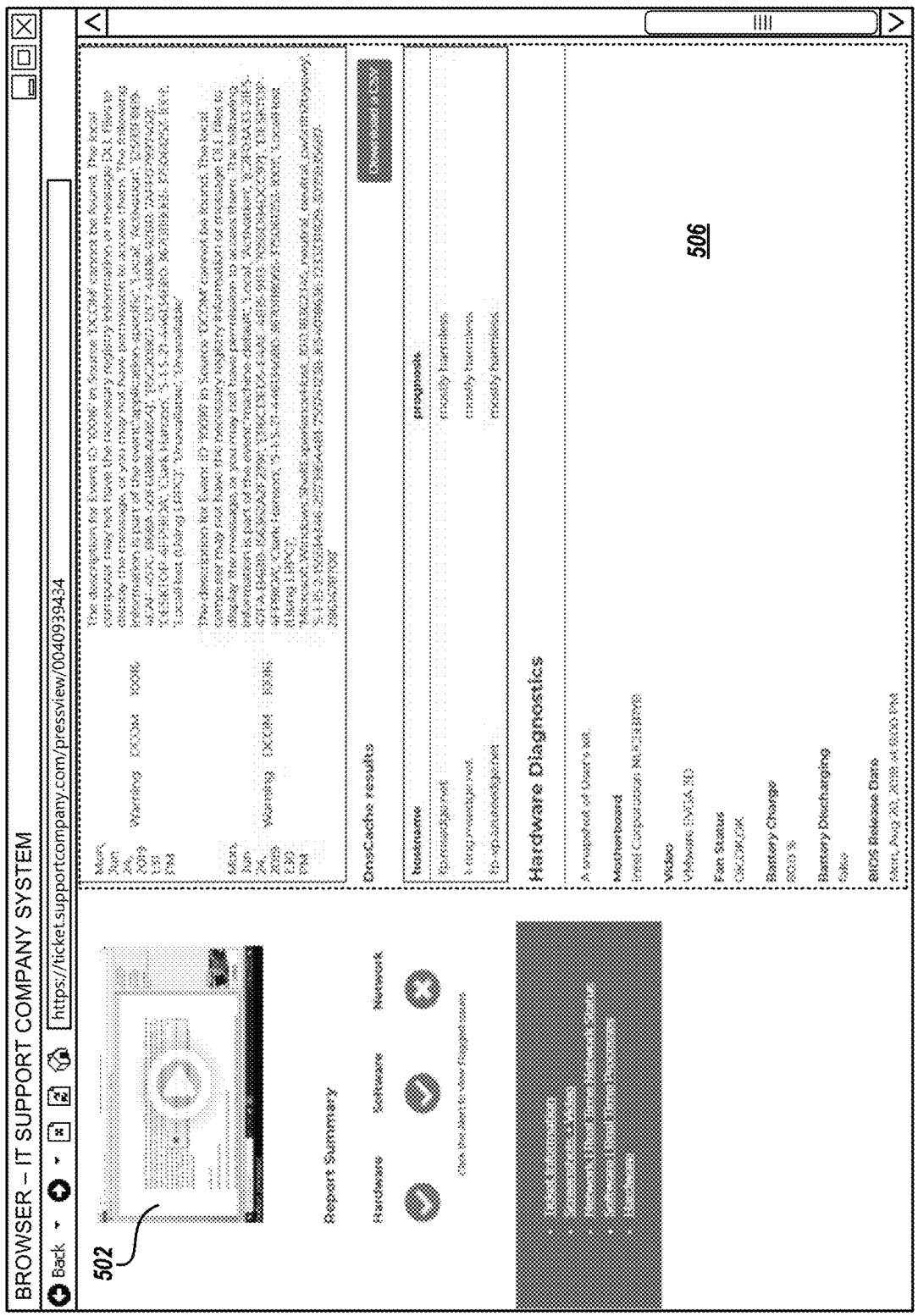

In some embodiments, the ticket data 126 may comprise primarily of data provided by the end user through the forms 400A-400D described above, including the problem description and textual representations of the various radio button and checkbox selections. The server-side software 122 may further include additional, useful information in the ticket data 126, such as the hostname and IP address of the end-user computer 102, the currently logged in end user, and the like. According to some embodiments, the ticket data 126 may further contain an URL linking the to a display of all of the issue information and computer usage and diagnostic data gathered by the client-side software 112 and included in the issue report 116. For example, as shown in FIGS. 5A-5C, the server-side software 122 may provide an issue information display 500 as a web page rendered from the issue report 116 that can be linked in the URL included in the ticket data 126.

When the technical resource selects the URL in the corresponding ticket in the ticketing system 132, the technical resource may be provided with the complete details of the issue as collected by the client-side software 112 regarding the issue. This may include the annotated slideshow 502 built from the screenshots and event data for a display of events leading up to the occurrence of the issue; the complete ticket information 504 entered by the end user in the issue information GUI and sent in the ticket data; network, software, hardware, process, and other diagnostic information 506 collected from the end-user computer 102 in real-time at the time of the issue; results of any pre-processing and analysis performed by the client-side software 112 and/or server-side software 122 from the collected data; and the like. In some embodiments, elements of the diagnostic information that are suspect or not nominal may be highlighted, as shown at 508, based on normal ranges for the elements stored with the client-side software 112 or server-side software 122.

According to some embodiments, the ticket information 504 may include a user trust indicator 510. The user trust indicator 510 may indicate whether the end user information contained in the ticket information 504 indicates a valid combination of user identification elements for the user, such as email address, hostname, currently logged-in user, and/or any combination of these and other user identification elements, based on previously submitted tickets. If the user trust indicator 510 does not indicate a combination of user identification elements, then the technical resource may give the ticket additional scrutiny in regard to the validity of the submission. Once the combination has been validated by the technical resource, the technical resource may change the user trust indicator 510 through the GUI to indicate to the server-side software 122 that future submissions containing the combination of user identification elements are valid. The server-side software 122 may store this information in its database for future validations.

In some embodiments, the web page may contain script code that renders the entire issue information display 500 locally in the browser. The script code may retrieve the data/information from the issue report 116 stored in one or more specified, secure storage resources from a third-party cloud storage provider, such as Amazon AWS S3 buckets secured by cryptographic keys and access control lists ("ACLs"). The script code may further format the issue information display 500, including analyzing the diagnostic data and information and comparing to external data, highlighting suspect or out-of-range diagnostic information, flagging potential trouble areas, and the like. The server-side software 122 may receive the issue report 116, format and send the ticket data 126 to the ticketing system 132, store the data/information from the issue report in the S3 buckets, and remove any remaining data from the back-end server system 120. In this way, the service provider may be able to ensure that no data/information regarding the issue is maintained or processed on the back-end server system 120 for future access to the data.

In further embodiments, the server-side software 122 may operate on the IT support company systems 130 or in cloud-based processing and storage resources provisioned and maintained by the IT support company in order to ensure the IT support company maintains control over the security of all issue-related data and information. In further embodiments, the server-side software 122, technical resource dashboard 124, and ticketing system 132 may all be executed on processing and storage resources provisioned and maintained by the enterprise organization containing the end-user computer 102, with the back-end server system 120 simply providing client-side software 112 and server-side software 122 updates and verification and maintenance of licenses or subscriptions for individual end users and/or computers. Any number of configurations or arrangements of processing, database, and storage resources for implementing the embodiments described herein may be conceived by one of ordinary skill upon reading this disclosure beyond those shown in the figures and described above, and it is intended that all such configurations and arrangements be included within the scope of this application.

At step 320, the client-side software 112 checks if the transmission of the issue report to the server-side software 122 was successful. For example, if the submission of the issue failed in the server-side software processing for some reason, such as the email address being invalid or the end user not properly being setup in the appropriate ticketing system, the client-side software may display a new GUI on the end-user computer 102 to request additional information from the end user and then contact the server-side software 122 again to complete the processing and submission of ticket data 126 to the ticketing system. In some embodiments, the server-side software 122 and/or ticketing system 132 may simply enter a ticket with a generic catch-all user which was pre-created by the IT support company for such purposes.

If the submission of the issue failed because the server-side software 122 was unable to communicate with the IT support company systems 130, such as because of expired credentials or failures in the network(s) 110, then the GUI may display a configurable error message that provides instructions on how the end user may contact the IT support company for support on the issue, such as a phone number by which they may speak with a technical resource. If the submission of the issue failed because the client-side software 112 was unable to communicate with the back-end server system 120, then the issue report 116 or the relevant information/data from within may be encrypted and stored locally, as shown at step 322, for future manual retrieval by the technical resource. In some embodiments, the issue information entered by the user and/or other information/data from the issue report 116 may be encoded into a QR code which links to a website on the IT support company systems 130, and the QR code may be displayed on the display of the end-user computer 102. The end user may be able to scan the QR code with a smartphone or other mobile device to access support for the issue through the ticketing system 132 or other IT support company systems 130.

If, at step 320, the transmission was successful, then the client-side software 112 may display additional information in the GUI indicating the successful processing of the issue submission, and include additional information for the end user such as the ticket number for the corresponding ticket added to the ticketing system 132. The success display may include configurable text and a user-configurable link that informs the end user of next steps required for the resolution of the issue, if appropriate. For example, according to some embodiments the client-side software 112 may provide some options to the end user through the GUI allowing the user to attempt to automatically resolve the issue or go ahead and forward the ticket created in the ticketing system 132 to a technical resource. Any "autofix" options available may be specified by the client-side software 112 and/or server-side software 122 after analyzing or processing the collected diagnostic data.

For example, the GUI may display one or more of the following autofix options:

A "quick fix" option that will perform a small number of quick automated fixes that are designed to take approximately 1 minute or less to perform. These fixes may be customizable by the technical resource or IT support company and may include steps such as clearing the browser cache, clearing the print queue, and rebooting the computer.

A "long fix" option that will perform a series of typically longer diagnostic troubleshooting routines. This may also be customizable by the technical resource or IT support company and may include such actions as cleaning temporary files out of system storage, defragmenting the system drive, running a system file checker, running a system check disk, and running other automatic diagnose and repair utilities available in the operating system 106 or from third-parties and potentially installed with the client-side software 112.

A "system restore" option that will launch the built-in system restore and rollback interface of the operating system 106, if available.

A "forward ticket now" option that will allow the ticketing system 132 to immediately assign or forward the created ticket to a technical resource for resolution.

If, at step 324, the client-side software 112 determines that an autofix option has been selected by the end user, then the routine 300 proceeds to step 326, where the selected autofix routine is executed by the client-side software. From step 326, the routine 300 ends.

Figure 7:
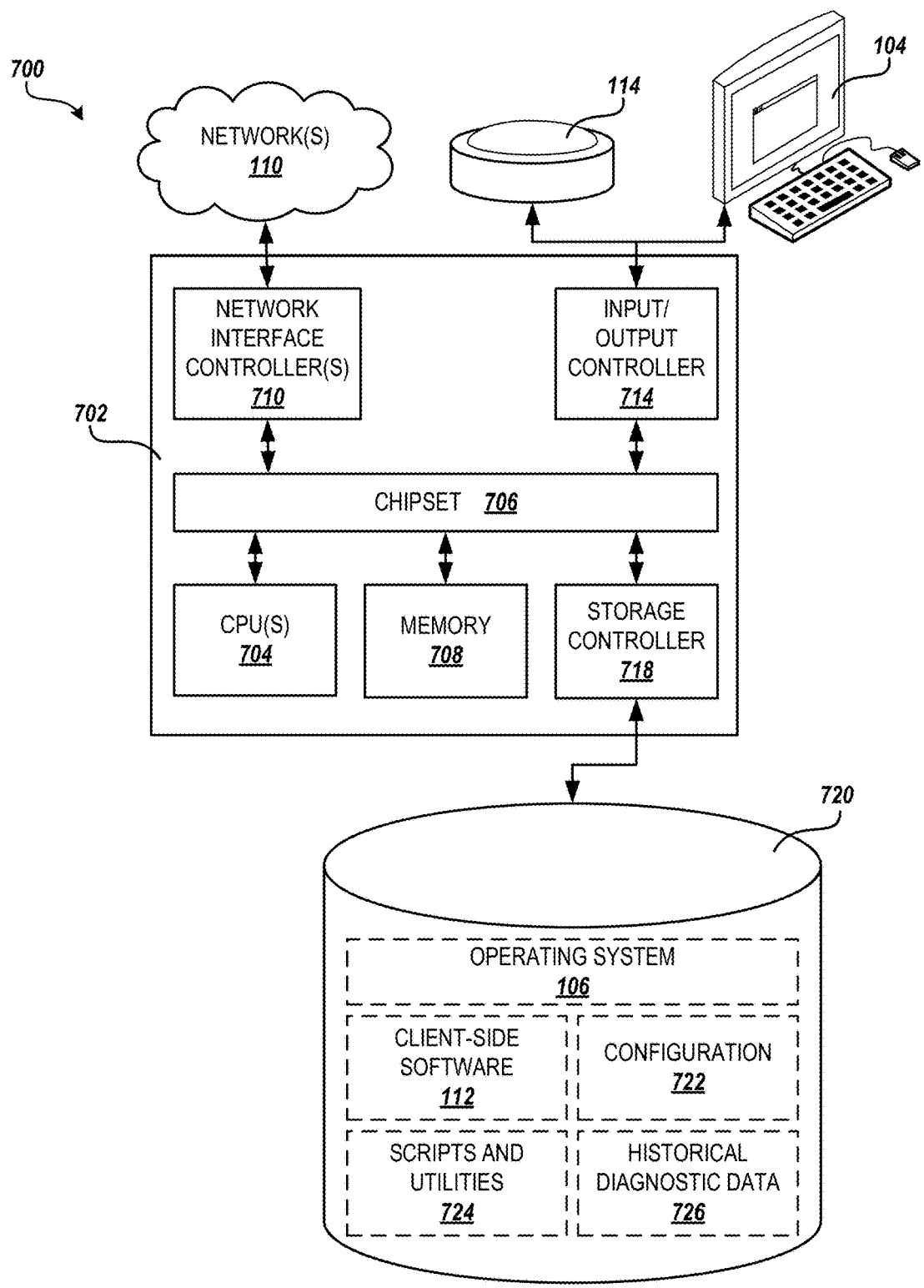
FIG. 7 is a block diagram showing an example computer architecture for computer(s) capable of executing the software components described herein, according to embodiments described herein.

FIG. 7 shows an example computer architecture 700 for a computer 702 capable of executing software components described herein for implementation of a dedicated physical user input device that is used to trigger collection and curation of real-time data and submission to a technical resource. The computer architecture 700 shown in FIG. 8 illustrates a conventional desktop computer, laptop, workstation, server, or other computing device, and may be utilized to execute any aspects of the software components presented herein described as executing on the end-user computer 102, the back-end server systems 120, the IT support company systems 130, or other computing platform. The computer 702 may include a baseboard, or "motherboard," which is a printed circuit board to which a multitude of components or devices may be connected by way of a system bus or other electrical communication paths.

In some embodiments, one or more central processing units ("CPUs") 704 operate in conjunction with a chipset 706. The CPU(s) 704 may be standard programmable processors that perform arithmetic and logical operations necessary for the operation of the computer 702. The chipset 706 provides an interface between the CPU(s) 704 and the remainder of the components and devices on the baseboard. The chipset 706 may provide an interface to a memory 708. The memory 708 may include a random access memory ("RAM") used as the main memory in the computer 702. The memory 708 may further include a computer-readable storage medium such as a read-only memory ("ROM") or non-volatile RAM ("NV RAM") for storing basic routines that that help to startup the computer 702 and to transfer information between the various components and devices. The ROM or NVRAM may also store other software components necessary for the operation of the computer 702 in accordance with the embodiments described herein.

According to various embodiments, the computer 702 may operate in a networked environment using logical connections to remote computing devices through one or more networks, such as the network(s) 110 described herein in regard to FIG. 1 or any other networking topology known in the art that connects the computer 702 to other, remote computers or computing systems. The chipset 706 may include functionality for providing network connectivity through one or more network interface controllers ("NICs") 710, such as a gigabit Ethernet adapter. It should be appreciated that any number of NIC(s) 710 may be present in the computer 702, connecting the computer to other types of networks and remote computer systems beyond those described herein.

The computer 702 may also include an input/output controller 714 for interfacing with various external devices and components, such as the standard user interface components 104 described in regard to FIG. 1. Other examples of external devices that may be interfaced to the computer 702 by the input/output controller 714 include, but are not limited to, a keyboard, a mouse, a touchpad, a touch screen, an electronic stylus, a computer monitor or other display, a printer, an external storage device, such as a Flash drive, a mobile device, a sensor, an actuator, and the like. According to some embodiments, the input/output controller 714 may include a USB controller. In further embodiments, the input/output controller 714 may connect the computer 702 to the button 114 utilized by an end user of the computer to trigger collection and curation of real-time data and submit it to a technical resource, as described herein.

The computer 702 may be connected to one or more mass storage devices 720 that provide non-volatile storage for the computer. Examples of mass storage devices 720 include, but are not limited to hard disk drives, solid-state (Flash) drives, optical disk drives, magneto-optical disc drives, magnetic tape drives, memory cards, holographic memory, or any other computer-readable media known in the art that provides non-transitory storage of digital data and software. The mass storage device(s) 720 may be connected to the computer 702 through a storage controller 718 connected to the chipset 706. The storage controller 718 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The mass storage device(s) 720 may store system programs, application programs, other program modules, and data, which are described in greater detail in the embodiments herein. According to some embodiments, the mass storage device(s) 720 may store the operating system 106 described herein utilized to control the operation of the computer 702. In some embodiments, the operating system 106 may comprise the WINDOWS® operating system from MICROSOFT Corporation of Redmond, Washington. In other embodiments, the operating system 106 may comprise the LINUX operating system, the WINDOWS® SERVER operating system, the UNIX operating system, or the like. The mass storage device(s) 720 may store other system or application program modules and data utilized by the computer 702, such as the client-side software 112, the server-side software 122, the technical resource dashboard 124, or the ticketing system 132 shown in FIG. 1 and described in the various embodiments. The mass storage device(s) 720 may further store the scripts and utilities 724, historical diagnostic data 726, and any other software, program modules, or data described herein. In some embodiments, the mass storage device(s) 720 may be encoded with computer-executable instructions that, when executed by the computer 702, perform the routine 300 described in regard to FIG. 3 for utilizing a dedicated physical user input device to trigger collection and curation of real-time data and submission to a technical resource.

It will be appreciated that the computer architecture 700 may not include all of the components shown in FIG. 7, may include other components that are not explicitly shown in FIG. 7, or may utilize an architecture completely different than that shown in FIG. 7. For example, the CPU(s) 704, memory 708 and mass storage devices 720, and NIC(s) 710 of the computer architecture 700 may represent virtualized resources from any number of computers or computing devices, or may represent generic processing resources, storage resources, and communication resources, respectively, of a cloud-based computing system, with the chipset 706 representing communication interlinks between the processing, storage, communication, and other computing resources in the cloud-based computing system. It is intended that all such computing architectures be included within the scope of this application.

Based on the foregoing, it should be appreciated that technologies for providing collection and curation of real-time data and submission to a technical resource upon an indication of an issue in a computing device from an end user are described herein. The subject matter described above is provided by way of illustration only and should not be construed as limiting. Various modifications and changes may be made to the subject matter described herein without following the example embodiments and applications illustrated and described, and without departing from the true spirit and scope of the present invention.

What is claimed is:

1. A method of collecting and curating data regarding an occurrence of an issue in a computing device, the method comprising steps of:
   executing software on the computing device to monitor and collect real-time computer usage data regarding usage of the computing device by an end user of the computing device and system diagnostic data from the computing device during use by the end user prior to the occurrence of the issue;
   receiving, by the software executing on the computing device, an indication of the occurrence of the issue from the end user;
   upon receiving the indication that the issued has occurred, collecting, by the software executing on the computing device, additional information regarding the issue from the end user by displaying a graphical user interface on a display of the computing device requesting entry of the additional information by the end user;
   collecting, by the software executing on the computing device, additional system diagnostic data about the computing device at a time of occurrence of the issue by executing concurrently on the computing device a plurality of data collection tasks;
   upon completion of the execution of a last of the plurality of data collection tasks, curating, by the software executing on the computing device, the collected real-time computer usage data and system diagnostic data, the additional information regarding the issue, and the additional system diagnostic data; and
   transmitting, by the software executing on the computing device, the curated real-time computer usage data and system diagnostic data, the additional information regarding the issue, and the additional system diagnostic data to a remote server for access by a technical resource.

2. The method of claim 1, wherein collecting computer usage data regarding usage of the computing device by the end user comprises:
   detecting, by the software executing on the computing device, a plurality of significant events of usage of the computing device by the end user; and
   upon detecting each of the plurality of significant events, taking, by the software executing on the computing device, a screenshot of a display of the computing device and storing the screenshot in a memory of the computing device along with related event data, wherein curating the collected information and data in regard to the issue comprises formatting an annotated slideshow from the screenshots and the related event data stored in the memory.

3. The method of claim 2, where the screenshots and event data related to each of the plurality of significant events are stored in a deque in the memory configured to hold a specific number of screenshots.

4. The method of claim 1, wherein transmitting the curated information and data to the remote server for access by the technical resource comprises extracting ticket data from the transmitted information and data at the remote server and entering the ticket data into a ticketing system associated to the technical resource.

5. The method of claim 4, wherein entering the ticket data into the ticketing system comprises providing the ticket data directly to the ticketing system through an application programming interface ("API") available over a network connection between the remote server and the ticketing system.

6. The method of claim 4, wherein entering the ticket data into the ticketing system comprises providing the ticket data indirectly to the ticketing system via an email message sent to an email address associated to the ticketing system.

7. The method of claim 1, wherein the indication of the occurrence of the issue received from the end user comprises a press of a dedicated physical button connected to the computing device by the end user.

8. The method of claim 1, wherein the plurality of data collection tasks comprises one or more taking current screenshots of all displays connected to the computing device, collecting information regarding all processes running on the computing device, collecting information regarding a hardware state of the computing device, collecting information regarding a network connection of the computing device, checking a system uptime of the computing device, and collecting a list of recorded events on the computing device.

9. The method of claim 1, further comprising, upon receiving the indication of the occurrence of the issue from the end user, sending, by the software executing on the computing device, an alert message to the remote server before collecting the additional information or the additional system diagnostic data, the remote server configured to make information regarding pending issues to the technical resource based on a plurality of alert messages received.

10. The method of claim 9, wherein the information regarding pending issues includes a display of a heatmap indicating a location related to each of the plurality of alert messages.

11. A system comprising:
   a remote server; and
   a computing device connected to the remote server over a network, the computing device operated by an end user an executing client-side software configured to
      monitor and collect real-time computer usage data regarding usage of the computing device by the end user and system diagnostic data from the computing device during use by the end user prior to occurrence of an issue, the real-time computer usage data including events comprising of user input detected by an operating system of the computing device,
      examine each event of the real-time computer usage data to determine whether the event is significant,
      upon determining that an event is significant, take a screenshot of at least one display monitor of the computing device and storing the screenshot in a memory of the computing device along with event data associated with the significant event,
      receive an indication of the occurrence of the issue from the end user,
      upon receiving the indication that the issued has occurred, collect additional information regarding the issue from the end user by displaying a graphical user interface on a display of the computing device requesting entry of the additional information by the end user,
      collect additional system diagnostic data about the computing device at a time of occurrence of the issue by executing concurrently on the computing device a plurality of additional data collection tasks,
      automatically generate an annotated slideshow of significant event screenshots from the screenshots and event data associated with the significant events stored in the memory, and
      upon completion of the execution of a last of the plurality of data collection tasks, transmit the collected real-time computer usage data, additional information, and additional system diagnostic data along with the generated annotated slideshow of significant event screenshots to the remote server to be used in creation of a ticket in a ticketing system.

12. The system of claim 11, wherein the indication of the occurrence of the issue received from the end user comprises a press of a dedicated physical button connected to the computing device by the end user.

13. The system of claim 12, wherein the dedicated physical button comprises a single-button device connected to the computing device through a universal serial bus ("USB") connection.

14. The system of claim 13, wherein the single-button device is recognized as an additional keyboard by the computing device and configured to send a predetermined key combination to the computing device when the button is pressed.

15. The system of claim 11, wherein the plurality of data collection tasks comprises one or more taking current screenshots of all displays connected to the computing device, collecting information regarding all processes running on the computing device, collecting information regarding a hardware state of the computing device, collecting information regarding a network connection of the computing device, checking a system uptime of the computing device, and collecting a list of recorded events on the computing device.

16. The system of claim 11, wherein the created ticket includes a link to the generated annotated slideshow of significant event screenshots available on the remote server.

17. A non-transitory computer-readable medium containing computer-executable instructions that, when executed by a processor of an end-user computing device, cause the computing device to:
    monitor and collect real-time computer usage data regarding usage of the computing device by an end user of the computing device and system diagnostic data from the computing device during use by the end user prior to occurrence of an issue, the real-time computer usage data including events comprising of user input detected by an operating system of the computing device;
    examine each event of the real-time computer usage data to determine whether the event is significant;
    upon determining that an event is significant, taking a screenshot of all display monitors of the computing device and storing the screenshot in a memory of the computing device along with event data associated with the significant event;
    receive an indication of the occurrence of the issue from the end user;
    upon receiving the indication that the issued has occurred, collect information regarding the issue from the user through a graphical user interface ("GUI") displayed on a display of the computing device;
    collect additional system diagnostic data about the computing device at a time of occurrence of the issue by executing concurrently on the computing device a plurality of additional data collection tasks;
    upon completion of the execution of a last of the plurality of data collection tasks, curate the collected real-time computer usage data and system diagnostic data, information regarding the issue, and additional system diagnostic data in regard to the issue, curating the real-time computer usage data including automatically generating an annotated slideshow of significant event screenshots from the screenshots and event data associated with the significant events stored in the memory; and
    forward the curated information and system diagnostic data to a technical resource for resolution of the issue.

18. The non-transitory computer-readable medium of claim 17, wherein forwarding the curated information and system diagnostic data to the technical resource comprises transmitting ticket data extracted from the curated information and system diagnostic data and to a ticketing system associated with the technical resource.

19. The non-transitory computer-readable medium of claim 17, wherein the plurality of data collection tasks comprises one or more taking current screenshots of all displays connected to the computing device, collecting information regarding all processes running on the computing device, collecting information regarding a hardware state of the computing device, collecting information regarding a network connection of the computing device, checking a system uptime of the computing device, and collecting a list of recorded events on the computing device.

20. The non-transitory computer-readable medium of claim 17, containing further computer-executable instructions that cause the computer to, upon receiving the indication of the occurrence of the issue from the end user, send an alert message to a remote server before collecting the information or the system diagnostic data, the remote server configured to make information regarding pending issues available to the technical resource based on a plurality of alert messages received.

\* \* \* \* \*